(12) United States Patent
Stall

(10) Patent No.: US 7,453,473 B2
(45) Date of Patent: *Nov. 18, 2008

(54) METHOD AND APPARATUS FOR HIGH-PERFORMANCE RENDERING AND HIT TESTING OF A WINDOW TREE

(75) Inventor: Jeffrey E Stall, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 325 days.

This patent is subject to a terminal disclaimer.

(21) Appl. No.: 11/035,640

(22) Filed: Jan. 14, 2005

(65) Prior Publication Data
US 2005/0134585 A1  Jun. 23, 2005

Related U.S. Application Data

(63) Continuation of application No. 09/885,350, filed on Jun. 20, 2001, now Pat. No. 6,954,218.

(60) Provisional application No. 60/244,287, filed on Oct. 30, 2000.

(51) Int. Cl.
*G06T 7/00* (2006.01)
(52) U.S. Cl. ...................................... 345/654
(58) Field of Classification Search ............... None
See application file for complete search history.

(56) References Cited

U.S. PATENT DOCUMENTS

| 4,550,315 | A | * | 10/1985 | Bass et al. ................. 715/803 |
| 4,731,606 | A | | 3/1988 | Bantz et al. |
| 4,984,183 | A | * | 1/1991 | Ohuchi ...................... 345/626 |
| 5,251,322 | A | * | 10/1993 | Doyle et al. ................ 345/501 |
| 5,491,494 | A | | 2/1996 | Cornett et al. |
| 5,548,703 | A | * | 8/1996 | Berry et al. ................. 715/853 |
| 5,606,654 | A | * | 2/1997 | Schuur ....................... 345/440 |
| 5,838,319 | A | * | 11/1998 | Guzak et al. ................ 715/854 |
| 6,005,570 | A | | 12/1999 | Gayraud et al. |

(Continued)

OTHER PUBLICATIONS

Badros, Greg J., et al., "SCWM: An Intelligent Constraint-Enabled Window Manager," *Smart Graphics: Papers from the 2000 American Association for Artificial Intelligence Symposium*, Standford, California, Mar. 20-22, 2000, pp. 76-83.

(Continued)

*Primary Examiner*—Kee M. Tung
*Assistant Examiner*—Peter-Anthony Pappas
(74) *Attorney, Agent, or Firm*—Christensen O'Connor Johnson Kindness PLLC

(57) ABSTRACT

A method and apparatus for high-performance rendering and hit-testing of a window tree is provided. A window tree may be rendered using an application programming interface provided by the present invention. The application programming interface provides support for world-transforms, enabling entire sub-trees of the window tree to be rotated and scaled during rendering. In order to quickly render and hit-test the transformed nodes of the window tree, a stack-based implementation of the "painter's algorithm" is utilized to achieve fast rendering. By storing all state information on a stack regarding each node in the window tree and building new data structures containing rendering information for each node and its children, any portion of the sub tree may be rendered on demand.

13 Claims, 13 Drawing Sheets

U.S. PATENT DOCUMENTS 6,154,215 A * 11/2000 Hopcroft et al. ............ 345/418
6,300,957 B1 * 10/2001 Rao et al. .................. 345/441
6,400,372 B1 * 6/2002 Gossweiler et al. ......... 345/619
6,570,564 B1 * 5/2003 Sowizral et al. ............. 345/420

OTHER PUBLICATIONS

Baudelair, Patrick, and Maurine Stone, "Techniques for Interactive Raster Graphics," *Computer Graphics* 14(3):314-320, Jul. 1980.

Chandler, Richard, and Gary Faulkner, "The Painter's Algorithm," *PC Tech Journal* 3(11):181-184, Nov. 1985.

Edwards, Janet, "A Parallel Implementation of the Painter's Algorithm for Transputer Networks," *Proceedings of the Third International Conference on Applications of Transputers*, Glasgow, Scotland, Aug. 28-30, 1991, pp. 736-741.

Goodfellow, Michael J., "WHIM, The Window Handler and Input Manager," *Proceedings of the 1st International Conference on Computer Workstations*, San Jose, California, Nov. 11-14, 1985, pp. 12-21.

Little, Chip, "Mouse Messages: Processing Mouse Input Under OS/2 Presentation Manager," *Programmer's Journal* 8(3):48-54, May-Jun. 1990.

Miah, T., and J.L. Alty, "Vanishing Windows—A Technique for Adaptive Window Management," *Interacting with Computers* 12(4):337-355, Feb. 2000.

* cited by examiner

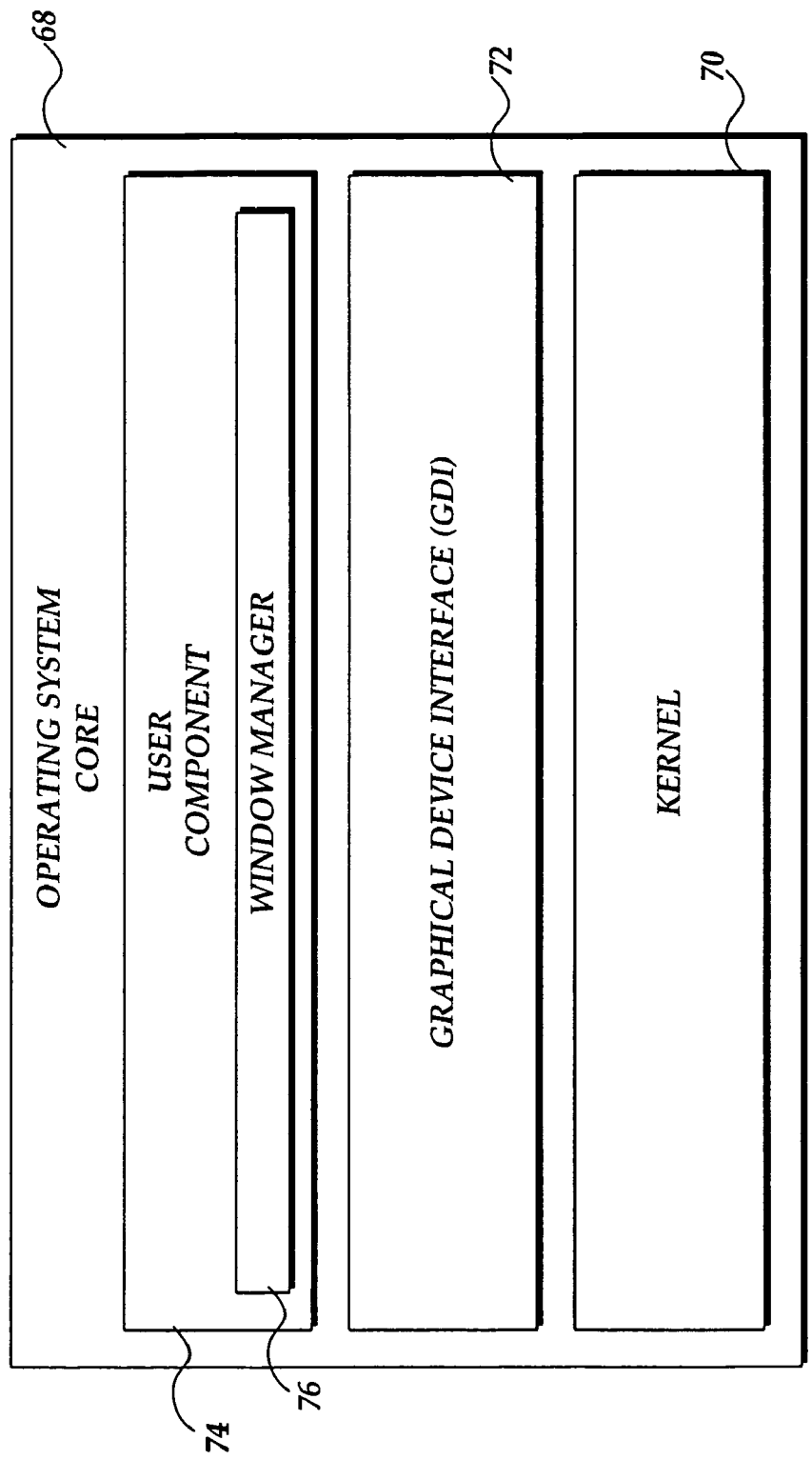

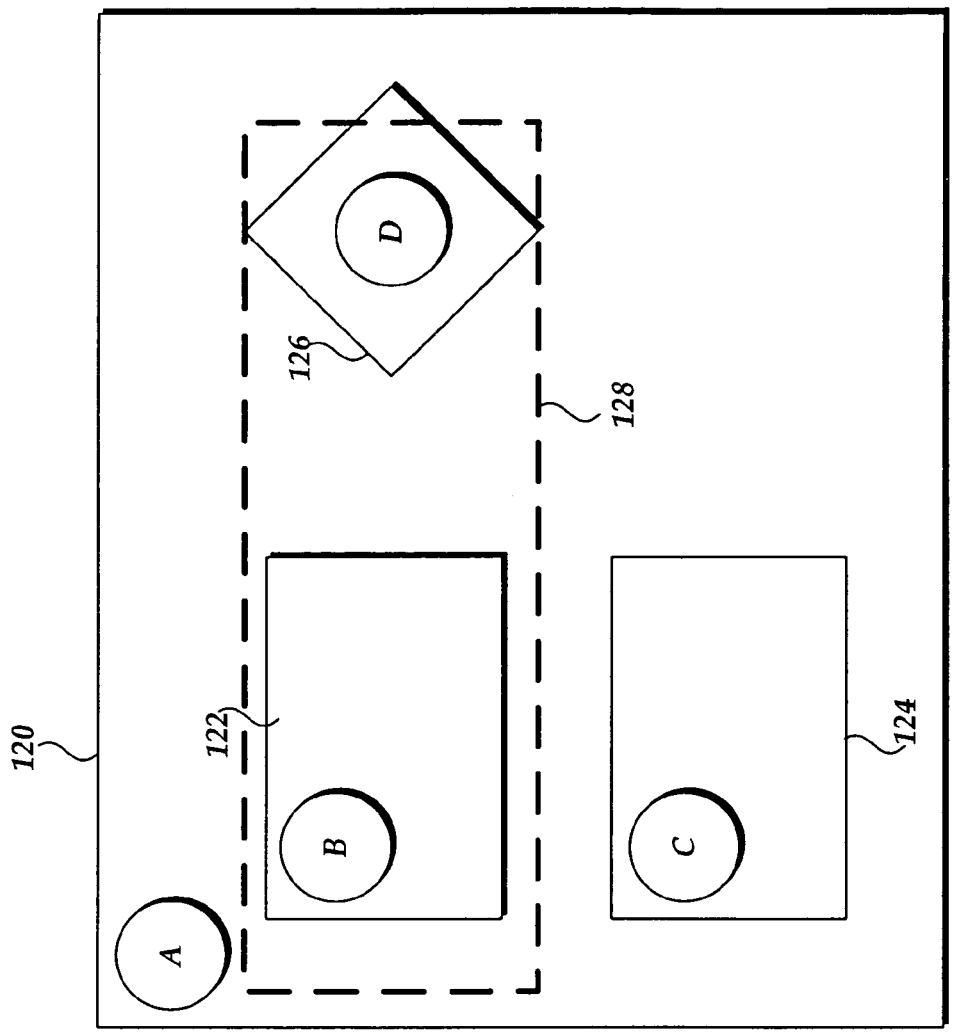
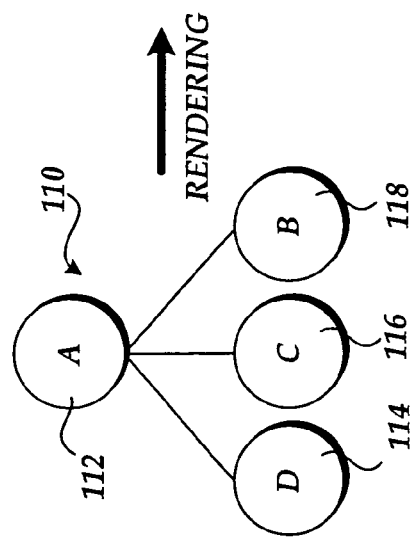
Fig.6D.

METHOD AND APPARATUS FOR HIGH-PERFORMANCE RENDERING AND HIT TESTING OF A WINDOW TREE

CROSS-REFERENCES TO RELATED APPLICATIONS

This application is a continuation of U.S. application Ser. No. 09/885,350, filed Jun. 20, 2001, the benefit of the filing date of which is hereby claimed under 35 U.S.C. § 120. U.S. application Ser. No. 09/885,350 claims the benefit of U.S. Provisional Application No. 60/244,287, filed Oct. 30, 2000, under 35 U.S.C. § 119, which benefit is also claimed for this application. Both of these applications are expressly incorporated herein by reference.

FIELD OF THE INVENTION

This invention generally relates to the field of computing devices with graphical user interfaces. More specifically, this invention relates to rendering and hit-testing windows within a graphical user interface environment.

BACKGROUND OF THE INVENTION

Graphical user interfaces typically employ some form of a window manager to organize and render windows. Window managers commonly utilize a window tree to organize windows, their child windows, and other objects to be displayed within the window such as buttons, menus, etc. To display the windows on a display screen, a window manager parses the window tree and renders the windows and other objects in memory. The memory can then be displayed on a video screen. A window manager may also be responsible for "hit-testing" input to determine the window in which input was received. For instance, when a user moves a mouse cursor into a window and mouse "clicks," the window manager must determine the window in which the click was made and generate a message to that window.

Current window managers suffer from a number of drawbacks that limit their ability to manage a large number of windows and to perform advanced functions. For instance, current window managers suffer from severe performance limitations when rendering thousands of windows, children, or other objects. Moreover, these performance limitations impede current window managers from supporting advanced functions on windows, such as alpha-blending, rendering composition, and world-transforms, such as scaling and rotation of sub-trees of the window tree.

Therefore, in light of the above, there is a need for a method and apparatus for rendering a window tree that is optimized to manage a large number of windows and child window objects. There is a further need for a method and apparatus for rendering a window tree that allows advanced functions, such as world-transforms, to be applied to sub-trees of the window tree without an impact on system performance.

SUMMARY OF THE INVENTION

The present invention solves the above-problems by providing a method and apparatus for high-performance rendering and hit-testing of a window tree. According to an actual embodiment of the present invention, an application programming interface ("API") is provided through which a window tree may be rendered. The method and apparatus provides support for world-transforms, enabling entire sub-trees to be rotated and scaled during rendering. This is accomplished by emulating the math done by the rendering component when computing both invalidation intersection and hit-testing rectangles. Reusable user interface components, otherwise known as Visual Gadgets, are implemented without any special knowledge of the transforms. Moreover, by programming in "virtual pixels," the present invention can translate these on demand into physical pixels at the point of rendering, invalidation and hit-testing.

The present invention also provides support for multiple rendering surfaces. The present invention supports a variety of rendering surfaces, including, but not limited to, Graphics Device Interface ("GDI") HDC's, GDIplus Graphics, Direct-Draw Surfaces, and Direct3D objects. By providing an extensible architecture that abstracts out the differences between surfaces, the present invention can natively support a variety of different surfaces without requiring that they all support a common denominator. The surface is passed through the rendering pipeline, customizing at key places for specific operations, and is then passed in the callback to the surface type requested by a Visual Gadget. This allows the present invention to be utilized on platforms other than Microsoft Windows®, such as Linux or Macintosh®, which do not support any of these surface types.

The present invention also provides support for origin zeroing. A specific Visual Gadget may request that the present invention zero the origin on the rendering surface. This style may be dynamically changed on any Visual Gadget before and after creation. Although some window managers support either zeroing or not-zeroing the origin, the present invention supports both dynamically. This provides significant performance gains when zeroing the origin is not required by the Visual Gadget. The ease of programming when zeroing also greatly simplifies control rendering.

The present invention also provides support for "trivial painting." Trivial painting allows the present invention to highly optimize the rendering of entire sub-trees that meet certain criteria. By examining a single bit on each Visual Gadget when the tree is manipulated, the present invention is able to detect "trivialness" at render time and use an optimized rendering path to render the child sub-trees.

The present invention additionally provides stack-based painting and read-only callback. The present invention utilizes a stack-based implementation of the "painter's algorithm" to achieve very fast rendering. By storing all state on the stack, and building new data structures containing rendering information for the node and its children, the present invention can render any portion of the sub-tree on demand.

Because the present invention calls back to each control to render while traversing the window tree, special precautions must be taken to ensure that the tree's state is not changed during the callback. To accomplish this, the present invention is implemented in the user mode, provided by Microsoft Windows® in an actual embodiment of the present invention. This prevents the possibility that the tree's state may change if deadlocks were utilized in Microsoft Windows® kernel mode. The present invention also marks the window tree "Context" as "read-only," allowing only "read-only" API functions to be called and failing any "read/write" API functions. The present invention also does not release the window tree "Context Lock," preventing other threads from coming into the Context and failing because the Context is marked "read-only." This provides the added benefits of avoiding the overhead of continuously grabbing and releasing the critical section of the window tree, reduces thread contention, and improves rendering performance.

The present invention also provides a method, computer-controlled apparatus, and a computer-readable medium for providing high performance rendering and hit-testing of a window tree.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a block diagram illustrating additional aspects of an operating system utilized in conjunction with an actual embodiment of the present invention.

FIGS. 6D and 6E are block diagrams illustrating the application of a routine for computing the bounds of an invalidation rectangle to an illustrative group of windows.

DETAILED DESCRIPTION OF THE PREFERRED EMBODIMENT

The present invention is directed to a method and apparatus for providing high-performance rendering and hit-testing of a window tree. Aspects of the invention may be embodied in a computer executing an operating system capable of providing a graphical user interface. Referring now to the figures, in which like numerals represent like elements, an actual embodiment of the present invention will be described.

Figure 1:
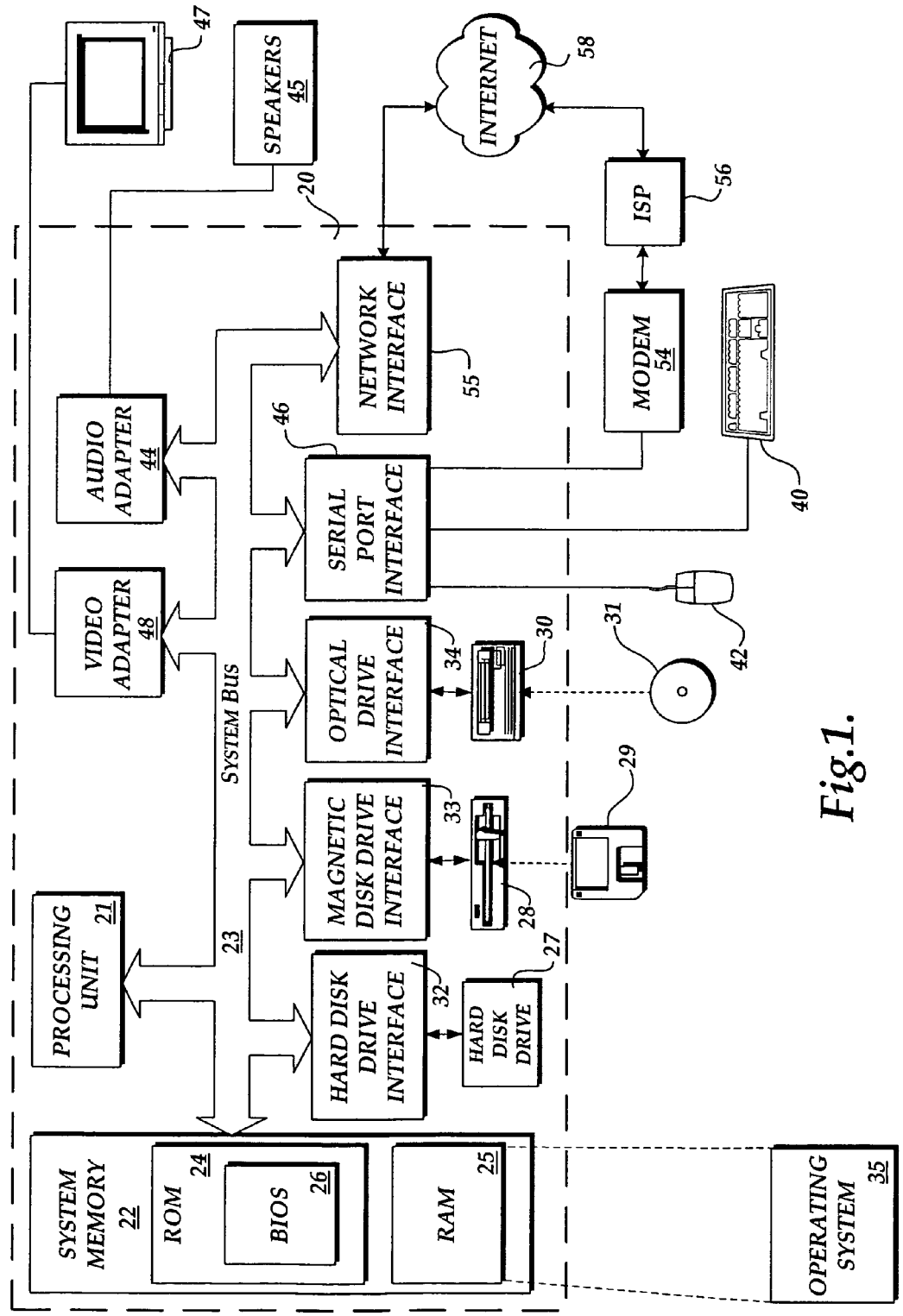
FIG. 1 is a block diagram showing an illustrative operating environment for an actual embodiment of the present invention.

Referring now to FIG. 1, an illustrative personal computer 20 will be described. The personal computer 20 comprises a conventional personal computer, including a processing unit 21, a system memory 22, and a system bus 23 that couples the system memory to the processing unit 21. The system memory 22 includes a read only memory ("ROM") 24 and a random access memory ("RAM") 25. A basic input/output system 26 ("BIOS") containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media such as a Digital Versatile Disk ("DVD").

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, ZIP disks, and the like, may also be used in the illustrative operating environment. A number of program modules may be stored in the drives and RAM 25, including an operating system 35, such as Windows 98®, Windows 2000®, or Windows NT® from Microsoft® Corporation. As will be described in greater detail below, aspects of the present invention are implemented within the operating system 35 in the actual embodiment of the present invention described herein.

Those skilled in the art should appreciate that the term "computer-readable media" as defined herein may include any available media that can be accessed by the personal computer 20. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, EEPROM, flash memory or other solid-state memory technology, CD-ROM, DVD or other optical storage, magnetic cassettes, magnetic tape, magnetic disk storage or other magnetic storage devices, or any other medium that can be used to store the desired information and that can be accessed by the personal computer 20.

A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus ("USB"). A monitor 47 or other type of display device is also connected to the system bus 23 via a display interface, such as a video adapter 48. In addition to the monitor, a personal computer 20 may include other peripheral output devices, such as speakers 45 connected through an audio adapter 44 or a printer (not shown).

As described briefly above, the personal computer 20 may operate in a networked environment using logical connections to one or more remote computers through the Internet 58. The personal computer 20 may connect to the Internet 58 through a network interface 55. Alternatively, the personal computer 20 may include a modem 54 and use an Internet Service Provider ("ISP") 56 to establish communications with the Internet 58. The modem 54, which may be internal or external, is connected to the system bus 23 via the serial port interface 46. It will be appreciated that the network connections shown are illustrative and other means of establishing a communications link between the personal computer 20 and the Internet 58 may be used.

Figure 2:
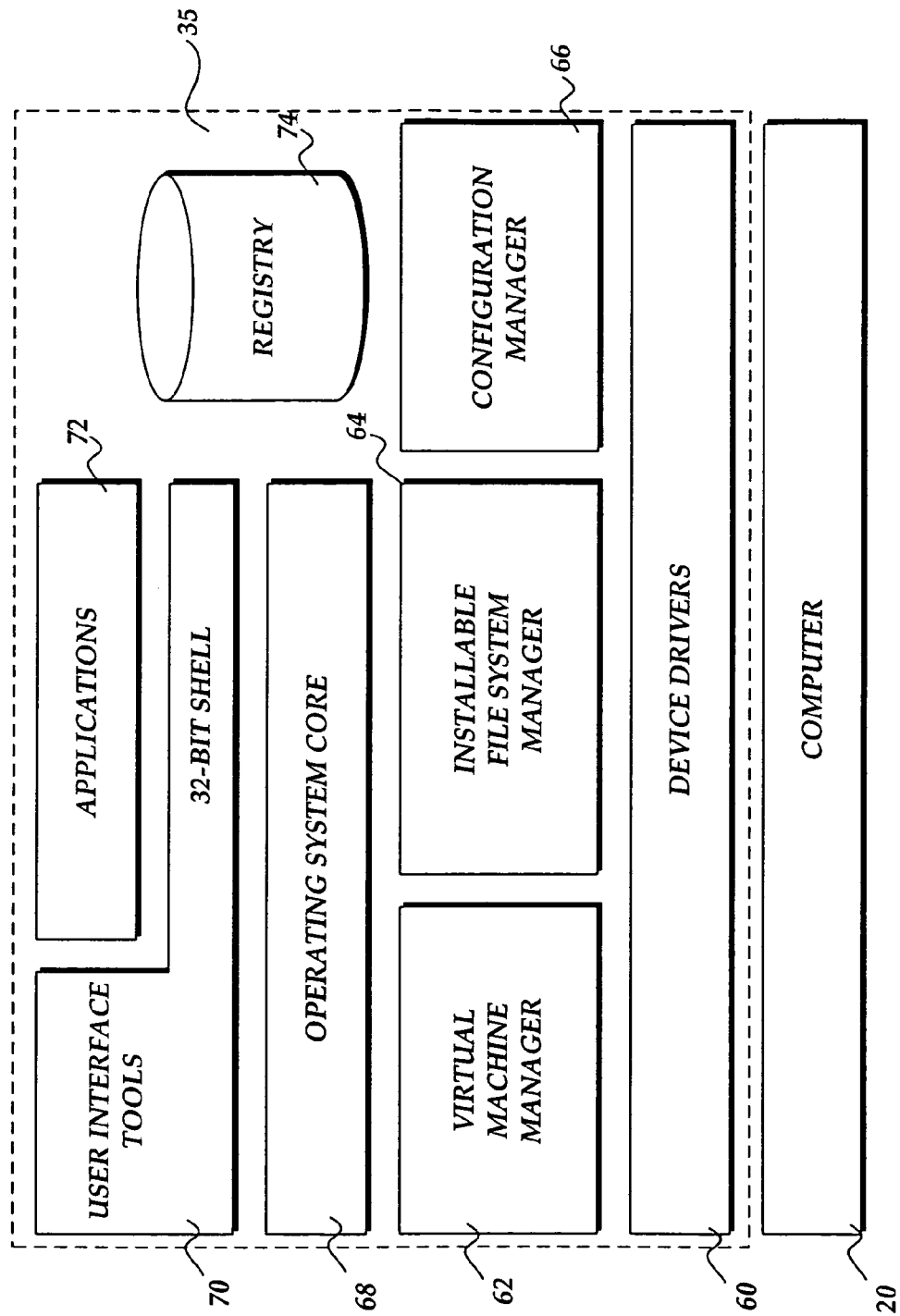
FIG. 2 is a block diagram showing aspects of an operating system utilized in conjunction with an actual embodiment of the present invention.

Referring now to FIG. 2, additional aspects of the operating system 35 will be described. According to the actual embodiment of the invention described herein, the operating system 35 comprises the Microsoft Windows®2000 operating system. The operating system 35 comprises a number of components for executing applications 72 and communicating with the hardware that comprises the personal computer 20. At the lowest level, the operating system 35 comprises device drivers 60 for communicating with the hardware 20. The operating system 35 also comprises a virtual machine manager 62, an installable file system manager 64, and a configuration manager 66. Each of these managers may store information regarding the state of the operating system 35 and the hardware 20 in a registry 74. The operating system 35 also provides a 32-bit shell 70, which includes user interface tools. An operating system core 68 is also provided that provides low-level functionality and hardware interfaces. According to the embodiment of the present invention described herein, aspects of the present invention are implemented in the operating system core 68. The operating system core 68 is described in greater detail below with respect to FIG. 3.

Turning now to FIG. 3, an illustrative operating system core 68 will be described. As mentioned above, the Microsoft Windows® 2000 operating system provides an illustrative operating environment for the present invention. The operating system core 68 of the Microsoft Windows®2000 operating system comprises three main components: the kernel 70; the Graphical Device Interface ("GDI") 72; and the user component 74. The GDI 72 is a graphical system that draws graphic primitives, manipulates bitmaps, and interacts with device-independent graphics drivers, including those for display and printer output devices. The kernel 70 provides base operating system functionality, including file I/O services, virtual memory management, and task scheduling. When a user wants to start an application, the kernel 70 loads the executable (".EXE") and dynamically linked library ("DLL") files for the application. The kernel 70 also provides exception handling, allocates virtual memory, resolves import references, and supports demand paging for the application. As an application runs, the kernel 70 schedules and runs threads of each process owned by an application.

The user component 74 manages input from a keyboard, mouse, and other input devices and output to the user interface (windows, icons, menus, and so on). The user component 74 also manages interaction with the sound driver, timer, and communications ports. The user component 74 uses an asynchronous input model for all input to the system and applications. As the various input devices generate interrupts, an interrupt handler converts the interrupts to messages and sends the messages to a raw input thread area, which, in turn, passes each message to the appropriate message queue. According to the actual embodiment of the invention described herein, each thread may have its own message queue.

In order to manage the output to the user interface, the user component 74 maintains a window manager 76. The window manager 76 comprises an executable software component for keeping track of visible windows and other viewable objects, and rendering these objects into video memory, such as that provided by a video adapter 48. The present invention may be implemented as a part of the window manager 74, or may be implemented in a manner so as to provide window manager 74 functionality through an API. Also, although the invention is described as implemented within the Microsoft Windows® 2000 operating system, those skilled in the art should appreciate that the present invention may be advantageously implemented within any operating system that utilizes a windowing graphical user interface.

Figure 4A:
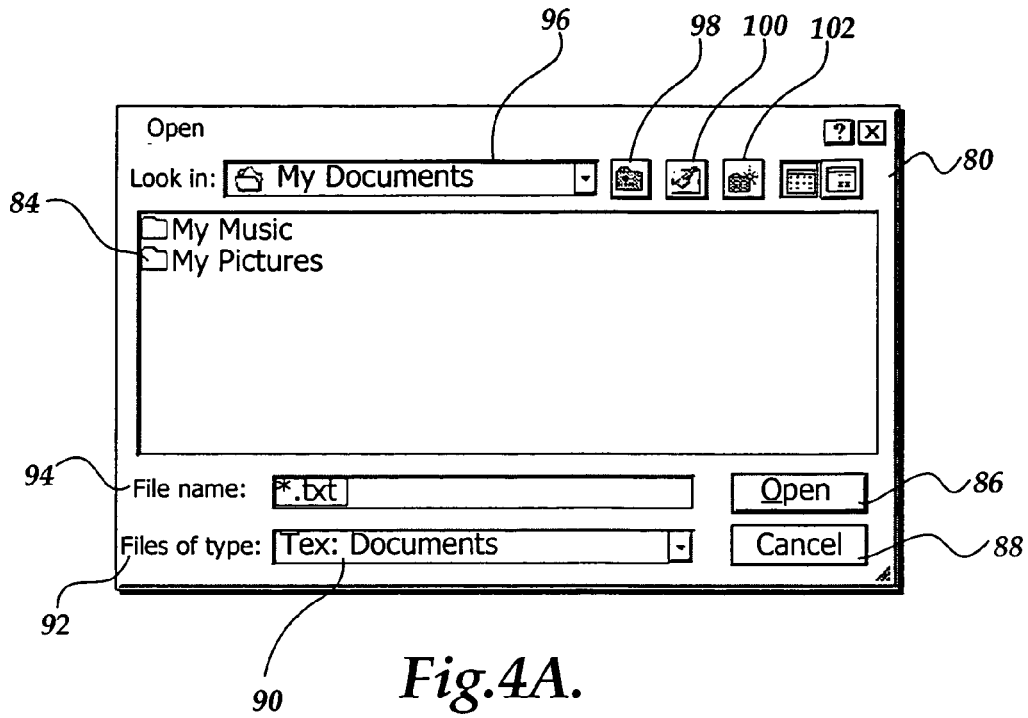
FIG. 4A is a screen diagram showing an illustrative window that may be rendered in an actual embodiment of the present invention.
Figure 4B:
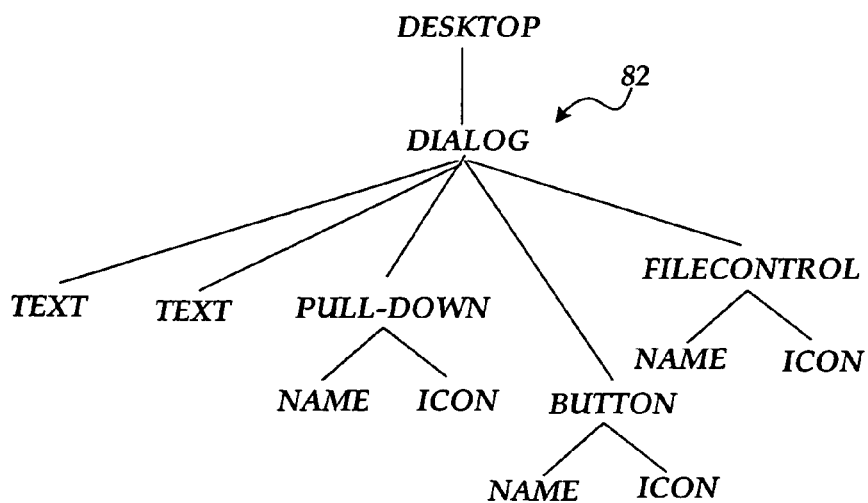
FIG. 4B is a block diagram showing an illustrative window tree maintained by an actual embodiment of the present invention.

Referring now to FIGS. 4A and 4B, additional aspects of the window manager 74 will be described. The window manager 74 maintains a window tree 82 to keep track of open windows and other visible objects. The window tree 82 describes the window hierarchy in a tree-like fashion. According to the actual embodiment of the invention described herein, the operating system owns the root of the window tree 82 and reserves the root for the 'desktop' window. The branches and leaves of the window tree 82 represent windows and the viewable objects that comprise the windows. The window tree 82 is organized so that a correct window hierarchy will be rendered when the window tree 82 is "walked" using the painter's algorithm. The painter's algorithm renders objects as a painter would, depth first, back to front. The painter's algorithm is well-known to those skilled in the art.

FIG. 4A shows an illustrative window 80 containing buttons 86, 88, 98, 100, and 102, a file control box 84 having an icon and a name, pull-down menus 90 and 96, and text entries 92 and 94. The window tree 82 shown in FIG. 4B illustrates a window tree for a portion of the window 80. The tree contains entries for the file control box 84 having an icon and a name, entries for the buttons having names and icons, an entry for the pull-down menu 96 having a name and an icon, and entries for the text entries 92 and 94. When the window tree 82 is rendered by the window manager 74, the window 80 is created. It should be appreciated by the reader that the window tree 82 is illustrative and is not the complete window tree for the window 80.

Figure 5:
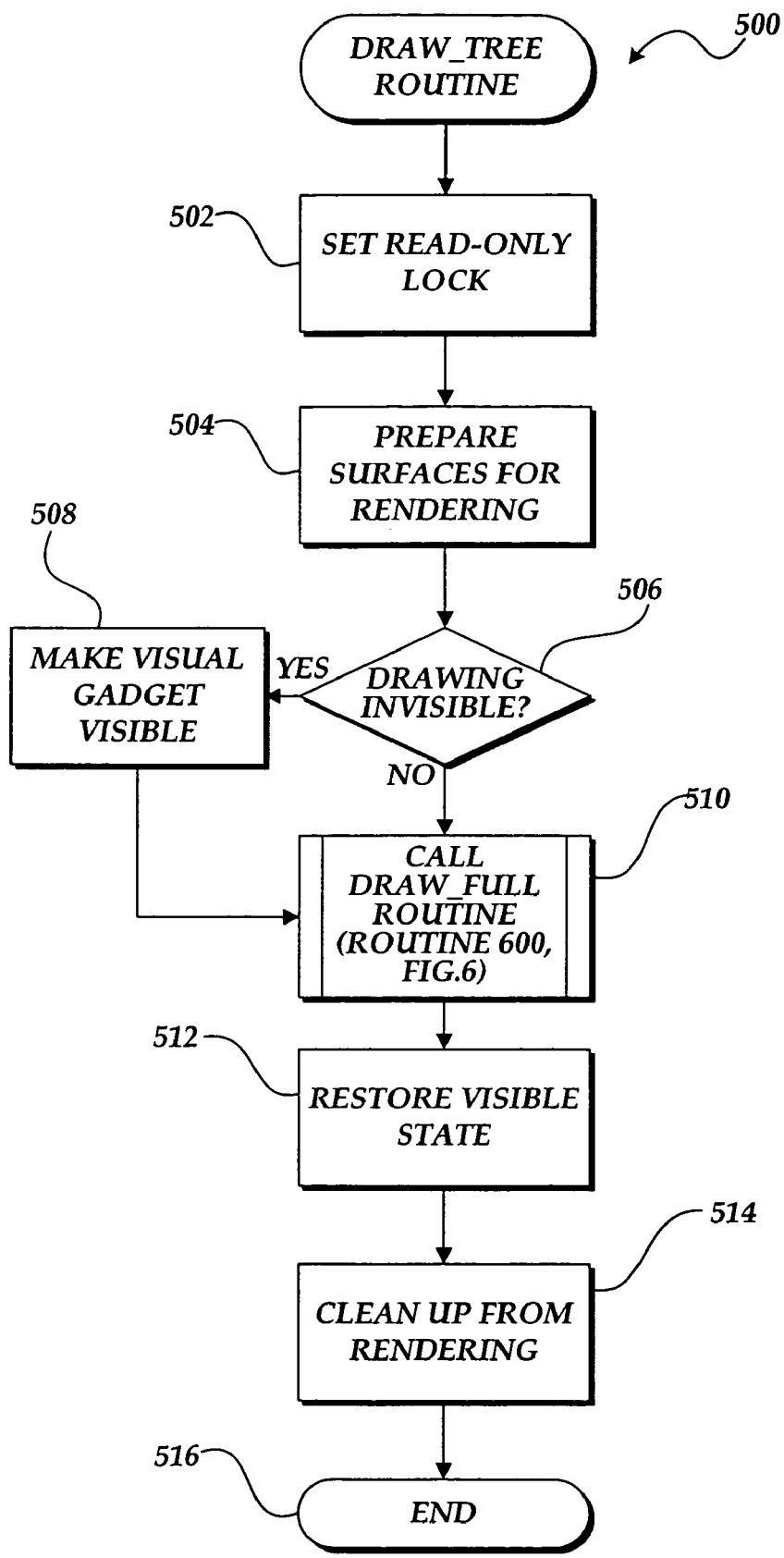
FIG. 5 is a flow diagram showing an illustrative routine for rendering a window tree according to an actual embodiment of the present invention.

Referring now to FIG. 5, an illustrative Routine 500 for rendering a window tree will be described. Generally described, the Routine 500 provides the beginning of the rendering pipeline. The Routine 500 initializes all states necessary to "walk" the window tree and initiates a recursive descent of the window tree. More specifically described, the Routine 500 begins at block 502, where a read-only "lock" is placed on the window tree. The lock prevents other objects from modifying the window tree while the render is in progress.

The Routine 500 continues from block 502 to block 504, where the rendering surfaces are prepared. This may include clipping to a specified invalidation rectangle to help improve performance by reducing unnecessary painting. This process includes identifying the portion of the screen that needs to be redrawn and limiting the redraw to that portion of the screen. Preparing the rendering surface may also include initializing a translation size. This process comprises determining the portion of the window tree that needs to be redrawn. More particularly, this process includes calculating the appropriate node of the window tree at which to begin rendering. In this manner, only a portion of the window tree needs to be rendered. Preparing the rendering surface may also include setting up palettes and initializing transformation routines. The Routine 500 then continues from block 504 to block 506.

At block 506, the Routine 500 determines whether invisible controls, or Visual Gadgets, should be drawn. If, at block 506, it is determined that invisible Gadgets are to be drawn, the Routine 500 branches to block 508, where the Gadgets are made visible. The Routine 500 then continues to block 510. If, at block 506, it is determined that invisible Gadgets are not to be drawn, the Routine 500 continues from block 506 to block 510. At block 510, the Routine 500 calls the DRAW_FULL routine. The DRAW_FULL routine is recursively called for each node to render the sub-tree to the given surface. The DRAW_FULL routine will be described below with respect to FIG. 6.

From block 510, the Routine 500 continues to block 512, where the visible state of the Visual Gadgets is restored. Routine 500 then continues from block 512 to block 514, where a clean-up procedure takes place that may include releasing unused memory, etc. The Routine 500 then continues to block 516, where it ends.

Figure 6A:
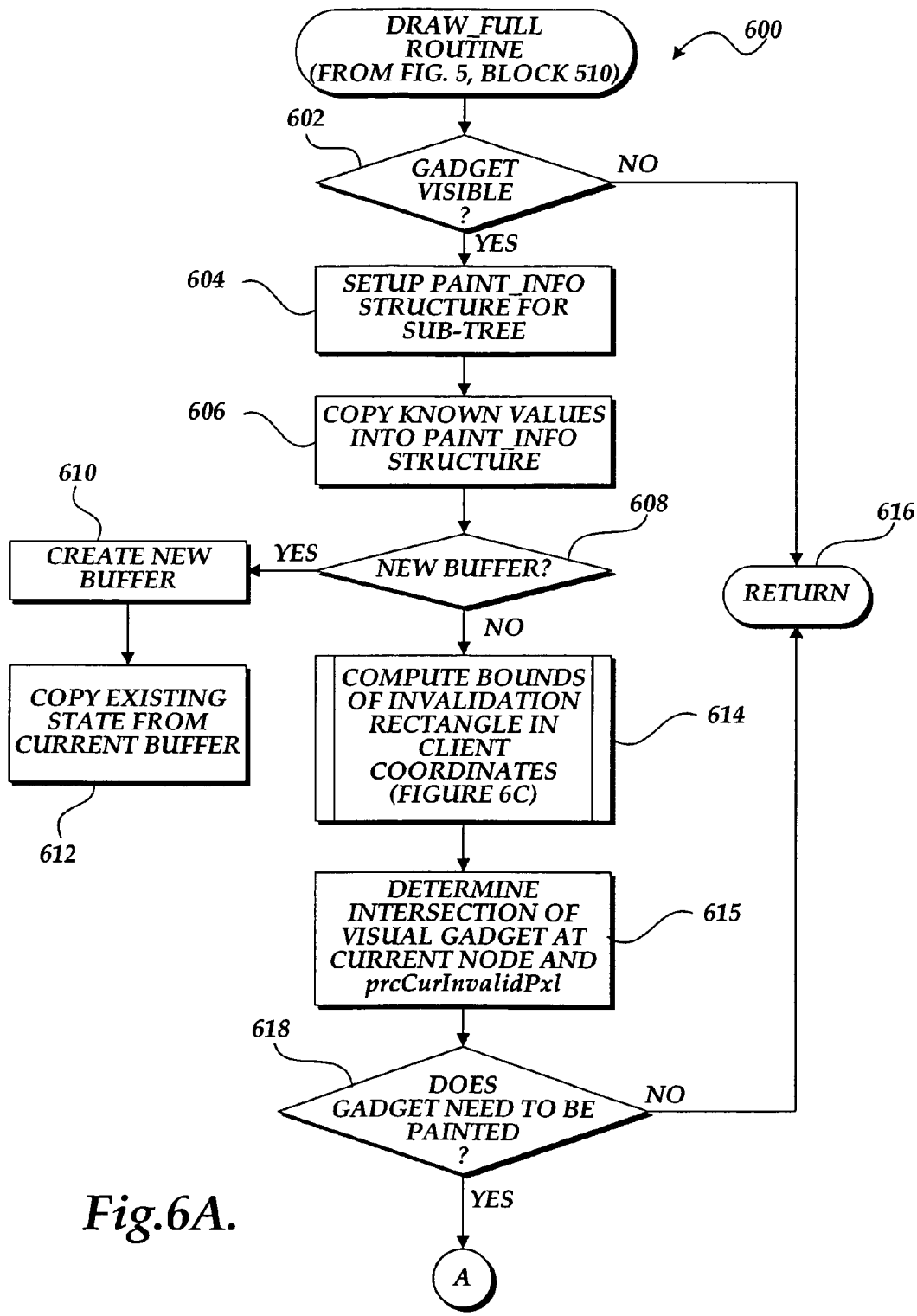
FIGS. 6A and 6B are flow diagrams showing an illustrative routine for rendering a non-trivial node in a window tree according to an actual embodiment of the present invention.
Figure 6B:
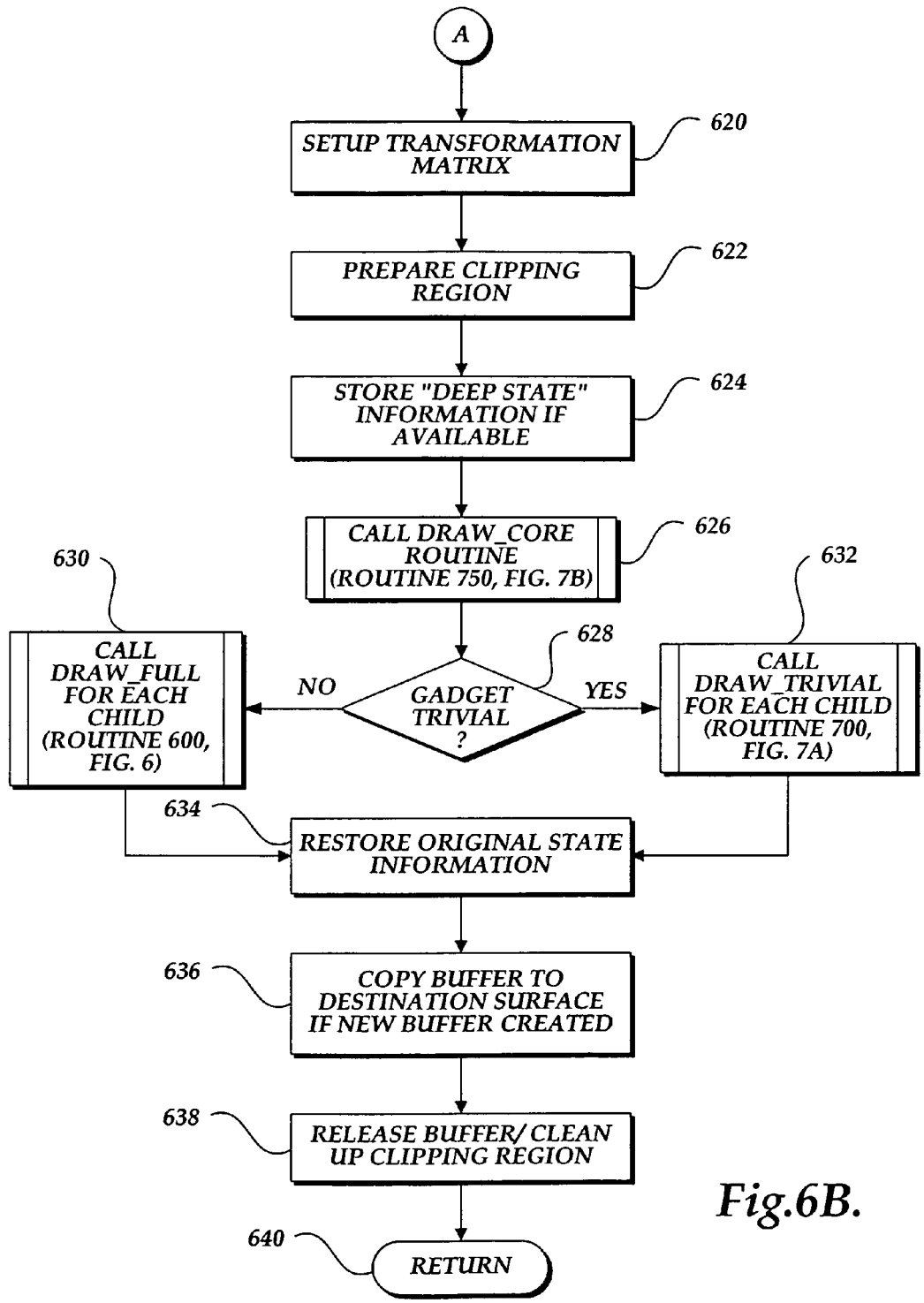

Referring now to FIGS. 6A and 6B, an illustrative Routine 600 will be described for implementing the DRAW_FULL routine described above. The DRAW_FULL routine is recursively called for each node, with exceptions for trivialness, to render the sub-tree to the given surface. The Routine 600 begins at block 602, where a determination is made as to whether the control, or Visual Gadget, at the current node in the window tree is visible. If the gadget is not visible, it does not need to be painted. Therefore, if the gadget is not visible, the Routine 600 branches to block 616, where it returns. If the gadget is visible, the Routine 600 continues to block 604, where a PAINT_INFO data structure is created to maintain information about the sub-tree of the current node in the window tree. The PAINT_INFO data structure contains data describing aspects of each sub-tree in the window tree. An illustrative PAINT_INFO data structure is shown in Table 1, below.

TABLE 1

```
Struct PAINT_INFO {
const RECT* prcCurInvalid Pxl;
const RECT* prcOrgInvalid Pxl;
DuSuface* pscf;
Matrix3 * pmatCurInvalid;
Matrix3 * pmatCurDC;
BOOL FBUFFERED;
# if ENABLED_OPTIMIZEDDIRTY
BOOL FDIRTY;
#endif
SIZE SIZEBUFFEROFFSETPXL;
};
```

The PRCCURINVALIDPXL element referenced in Table 1 comprises a pointer to a RECT structure for defining the coordinates of the upper-left and lower-right corners of a rectangle. The PRCCURINVALIDPXL element is utilized to store the coordinates of the invalidation rectangle fully transformed into coordinates relative to the current node of the window tree. As will be described in greater detail below, these coordinates may be utilized by intersection calculations to determine whether the sub-tree of the current mode needs to be repainted.

The PRCORGINVALIDPXL element referenced in Table 1 also comprises a pointer to a RECT structure. The PRCORGINVALIDPXL element is utilized to store the invalidation rectangle in coordinates relative to the current node. For instance, if the Visual Gadget located at the current node has been transformed, the PRCORGINVALIDPXL element is used to store the coordinates of the invalidation rectangle in a similarly transformed space. As will be described below, a transformation matrix is utilized to transform PRCORGINVALIDPXL into PRCCURINVALIDPXL.

The PSRF variable referenced in Table 1 comprises a pointer to the current surface being rendered into. Each time a buffer is created, a new surface is also created for that buffer to render into. The PMATCURINVALID matrix referenced in Table 1 is a matrix created using "anti-" transformations and is utilized in transforming PRCORGINVALIDPXL into coordinates relative to the current node of the window tree. Similarly, the PMATCURDC matrix referenced in Table 1 comprises a matrix created using "regular" transformations to determine the world-transforms to be applied to the PSRF variable when rendering the sub-tree of the current node. The FBUFFERED element comprises a Boolean variable specifying whether at least one buffer has been created. The FBUFFERED variable is used to determine when a double-buffer has been set up.

The Boolean variable FDIRTY referenced in Table 1 is utilized when "dirty-state" optimizations have been enabled to determine whether the current sub-tree is 'dirty' as the result of a 'dirty' ancestor node. The variable SIZEBUFFEROFFSETPXL holds the current translation offset to factor in, accounting for buffers set up by ancestors.

Still referring to FIGS. 6A and 6B, the Routine 600 continues from block 604 to block 606, where known values are copied into the PAINT_INFO structure, including the surface, the original invalid rectangle, and other buffering information. The PAINT_INFO structure is then allocated on the stack. This allows fast rendering because memory does not have to be allocated while painting. Moreover, this allows state information from a parent node to be inherited by the children of the node. This also advantageously provides a performance boost since this information does not have to be recreated at each child node.

The Routine 600 then continues from block 606 to block 608, where a determination is made as to whether a new buffer will be utilized to render the sub-tree. A buffer is an off-screen memory area that may be modified and later painted into screen memory. Buffering allows flicker-free drawing, applying alpha for fading, and applying bitmap transformations after rendering, such as convolution filters. If a new buffer will be used, the Routine 600 branches to block 610, where a new buffer is created. The Routine 600 then continues from block 610 to block 612, where the contents of the portion of the screen memory corresponding to the buffer is copied into the buffer. The Routine 600 then continues from block 612 to block 614.

If, at block 608, it is determined that a new buffer will not be used, the Routine 600 continues from block 608 to block 614. At block 614, the bounds of the invalidation rectangle are computed in client coordinates. Although a window should be prepared to update the entire window whenever it receives the appropriate message, it often only needs to update a smaller area. This area is most often a rectangular area within the client area. For example, this portion of the client area may need to be repainted when the area is overlaid by a dialog box. Repainting is required when the dialog box is removed. This area is known as an "invalidation rectangle." The presence of an invalid region in a client area is what prompts the operating system to transmit a message to the window indicating that a repaint is necessary. An illustrative Routine 650 is described below with respect to FIG. 6C for computing the bounds of the invalidation rectangle in client coordinates.

The Routine 600 continues from block 614 to block 615, where the intersection between the Visual Gadget located at the current node and the transformed rectangle defined by the PRCCURINVALIDPXL variable is computed. The Routine 600 then continues to block 618, where a determination is made as to whether the gadget needs to be painted based on the results of the intersection. If the gadget does not need to be painted, the Routine 600 branches to block 616, where it returns. If the gadget needs to be painted, the Routine 600 continues to block 620, where a surface transformation matrix is created. The transformation matrix is utilized to transform the gadget by rotating, scaling, changing the center location, or zeroing the gadget's origin. In this manner, the window manager may provide support for world-transforms, enabling entire sub-trees to be rotated and scaled while rendering. This is accomplished by performing the math done by the rendering component when computing both invalidation intersection and hit-testing rectangles. The Routine 600 then continues to block 622, where a clipping region is prepared for the sub-tree that will be inherited by the children of the current node.

The Routine 600 continues from block 622 to block 624 where "deep state" information is stored on the stack. Deep state information comprises information that should be inherited only by children from a parent. The Routine 600 then continues from block 624 to block 626, where the DRAW_CORE routine is called. The DRAW_CORE routine provides a common callback for both DRAW_FULL and DRAW_CORE to perform the actual rendering of a specific node. An illustrative DRAW_CORE routine is described in detail below with respect to FIG. 7B.

From block 626, the Routine 600 continues to block 628, where a determination is made as to whether the current gadget is trivial. The trivialness of a gadget is determined by examining a bit associated with the gadget. The bit is set depending upon other properties of the gadget. So, for instance, the bit may be set if the gadget and its children do not require transformation. According to the actual embodiment of the invention described herein, "trivialness" is defined as a gadget and any of its children having the "GS_ZEROORIGIN," "GS_CLIPSIBLINGS," "GS_BUFFERED," and "GS_CACHED" parameters set to off, and not having any transforms applied. If the gadget is trivial, the Routine branches to block 632, where the DRAW_TRIVIAL routine is called for each child of the current node. The DRAW_TRIVIAL routine provides an optimized code path when rendering the children of trivial Visual Gadgets that eliminates the computationally expensive world-transforms that are required to zero the origin. An illustrative DRAW_TRIVIAL routine is described in greater detail below with respect to FIG. 7A.

If, at block 628, it is determined that the gadget is not trivial, the Routine 600 branches to block 630, where the DRAW_FULL routine is called for each child of the current node. In this manner, each node of a non-trivial sub-tree is recursively processed by the DRAW_FULL routine. From blocks 630 and 632, the Routine 600 continues to block 634, where the original state information is restored. From block 634 the Routine 600 continues to block 636, where a buffer, if created, is copied to the destination surface in video memory. From block 636, the Routine 600 continues to block 638 where the buffer is released and the clipping region is cleaned up. At block 640, the Routine 600 returns.

Figure 6C:
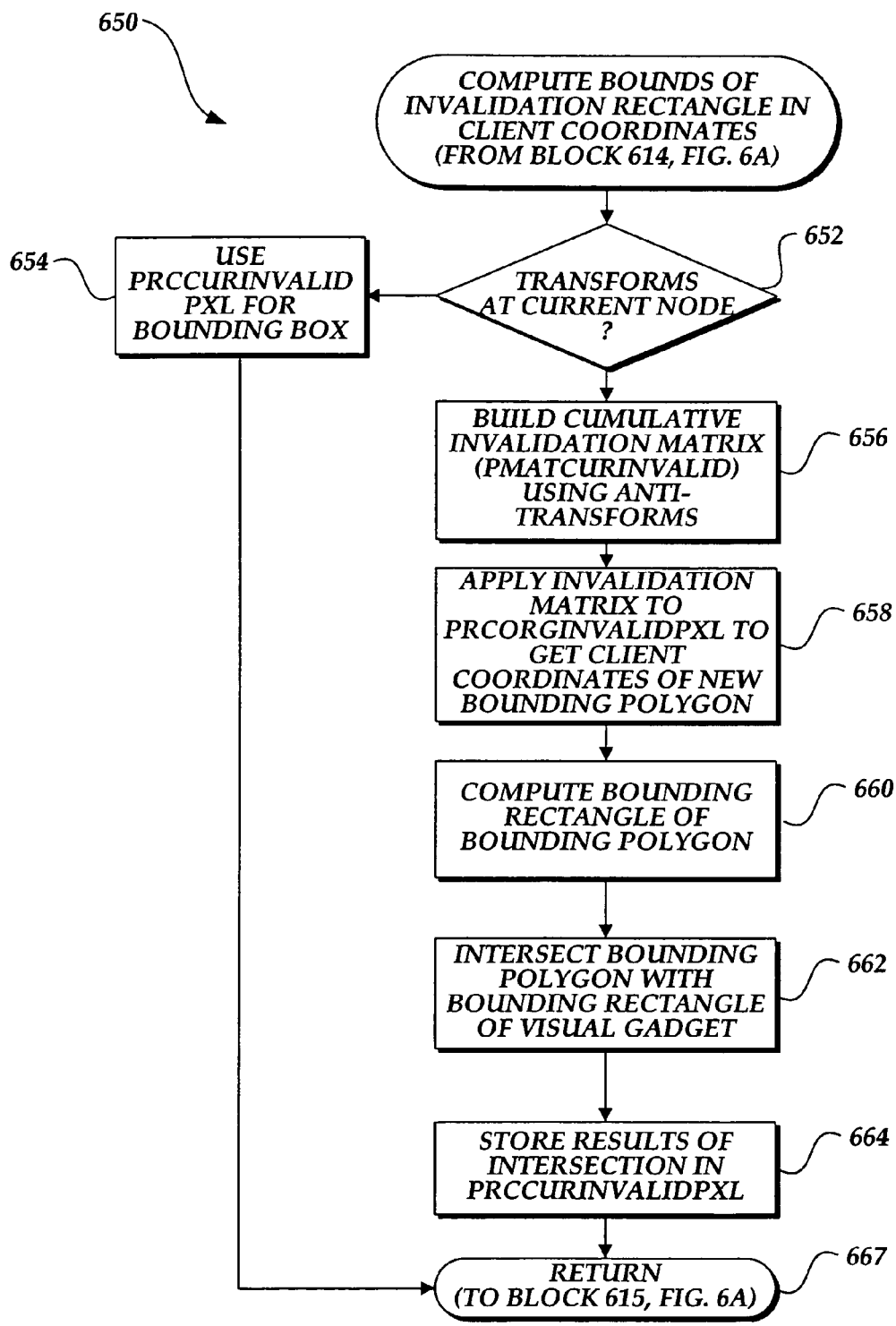
FIG. 6C is a flow diagram illustrating a routine for computing the bounds of an invalidation rectangle in client coordinates according to an actual embodiment of the present invention.

Turning now to FIG. 6C, an illustrative Routine 650 will be described for computing the bounds of an invalidation rectangle in client coordinates. As described briefly above with respect to FIG. 6A, in order to determine when a transformed Visual Gadget is within the bounds of an invalidation rectangle, the invalidation rectangle must be transformed into coordinates relative to the Visual Gadget. In order to accomplish this task, the Routine 650 begins at block 652, where a determination is made as to whether any transformations have been applied at the current node of the window tree. If no transformations have been applied at the current node, the Routine 650 branches from block 652 to 654. At block 654, the current contents of the PRCCURINVALIDPXL variable are utilized for the bounding box. Because no transforms have been applied to the Visual Gadget at the current node, the invalidation rectangle for the parent node may be utilized. The Routine 654 then branches to block 667, where it returns to block 615, shown in FIG. 6A.

If, at block 652, it is determined that transformations have been applied at the current node of the window tree, the Routine 650 continues to block 656. At block 656, the cumulative invalidation matrix PMATCURINVALID is updated using the antitransform of the transform applied to the Visual Gadget at the current node. The Routine 650 then continues from block 656 to block 658, where the invalidation matrix is applied to the PRCORGINVALIDPXL variable to obtain the client coordinates of the new bounding polygon. The Routine 650 then continues to block 660, where a bounding rectangle of the computed bounding polygon is identified. The bounding polygon is then intersected with the bounding rectangle of the Visual Gadget at the current node in the window tree at block 662. This intersection defines the new invalidation rectangle for the Visual Gadget at the current node of the window tree and is stored in the PRCCURINVALIDPXL variable at block 664. From block 664, the Routine 650 returns to block 615, shown in FIG. 6A.

Figure 6E:
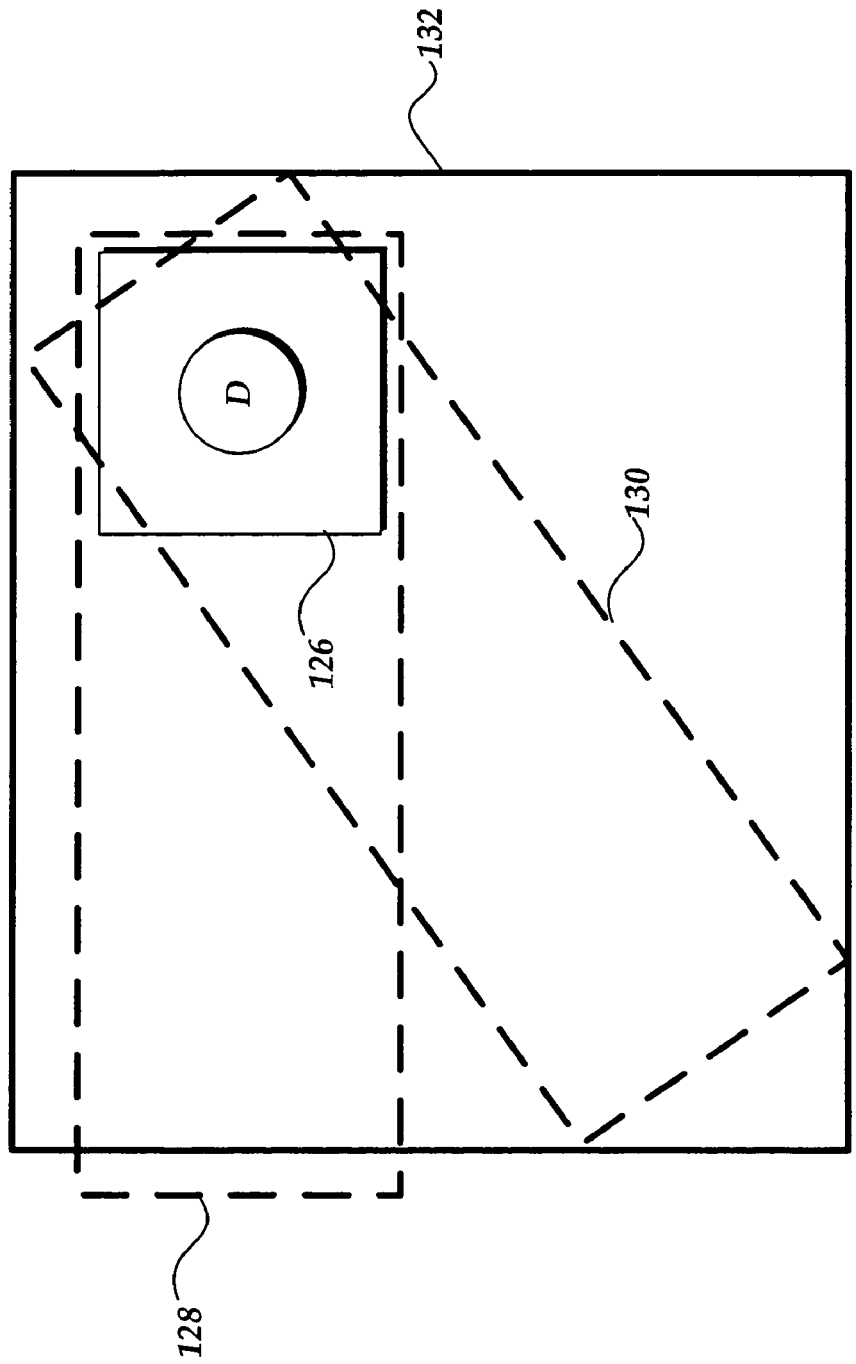

Turning now to FIGS. 6D and 6E, an application of the Routine 650 to an illustrative window tree 110 will be described. As shown in FIG. 6D, the window tree 110 comprises a root node A 112, a child node B 118, a child node C 116, and a child node D 114. When the window tree 110 is rendered, the Visual Gadget 120 corresponding to the root node A 112 is first rendered. The Visual Gadget 122 corresponding to the child node B 118 is then rendered. Subsequently, the Visual Gadget 124 corresponding to the child node C 116 is rendered. Finally, the Visual Gadget 126 corresponding to child node D 114 is rendered. As shown in FIG. 6D, the Visual Gadget 126 corresponding to child node D 114 has been rotated 45°. As will be described in greater detail below, the rotation of Visual Gadget 126 must be taken into account when computing the bounds of an invalidation rectangle and when hit-testing.

Once the Visual Gadgets shown in FIG. 6D have been rendered, they may be displayed. Subsequently, a window or other Visual Gadget, such as the window 128, may be displayed over the top of all or a portion of the Visual Gadgets. For instance, the window 128 completely overlays the Visual Gadget 122 and partially overlays the Visual Gadget 126. When the window 128 is closed, or otherwise removed, it is necessary to determine a portion of the screen which should be redrawn. To make this determination, the Routine 650 described above with reference to FIG. 6C is applied at each node of the window tree 110. With respect to the root node A 112, the child node B 118, and the child node C 116, the bounds of the window 128 may be utilized as the invalidation rectangle because no transformations have been applied to these nodes. However, with respect to the child node D 114, the bounds of the invalidation rectangle must be computed in coordinates relative to the Visual Gadget 126, because the Visual Gadget 126 has been rotated.

Although the Visual Gadget 126 is shown visually as having been rotated, the Visual Gadget 126 is unaware of the rotation. Instead, the Visual Gadget 126 believes that it has been rendered in a normal orientation as shown in FIG. 6E. Accordingly, an antitransform of the transformation applied to Visual Gadget 126 must be applied to the bounding box defined by the window 128. In order to accomplish this, a cumulative invalidation matrix is created using each of the antitransforms applied at the current node and at any of its parent nodes. This invalidation matrix has been applied to the bounding box for the parent node to obtain the client coordinates of a new bounding polygon 130. Subsequently, a bounding rectangle 132 of the bounding polygon 130 is obtained. The bounding polygon 132 is then intersected with the bounding rectangle of the Visual Gadget 126 to obtain the new invalidation rectangle for the current node. The results of this computation are then stored in the PRCCURINVALID-PXL variable and pushed on the stack. This invalidation rectangle may then be used by children of the current node in order to calculate the transformed invalidation rectangle at those children nodes. The invalidation rectangle may also be passed to the Visual Gadget to determine whether and what portion of the Visual Gadget should be rendered.

Figures 7A, 7B:
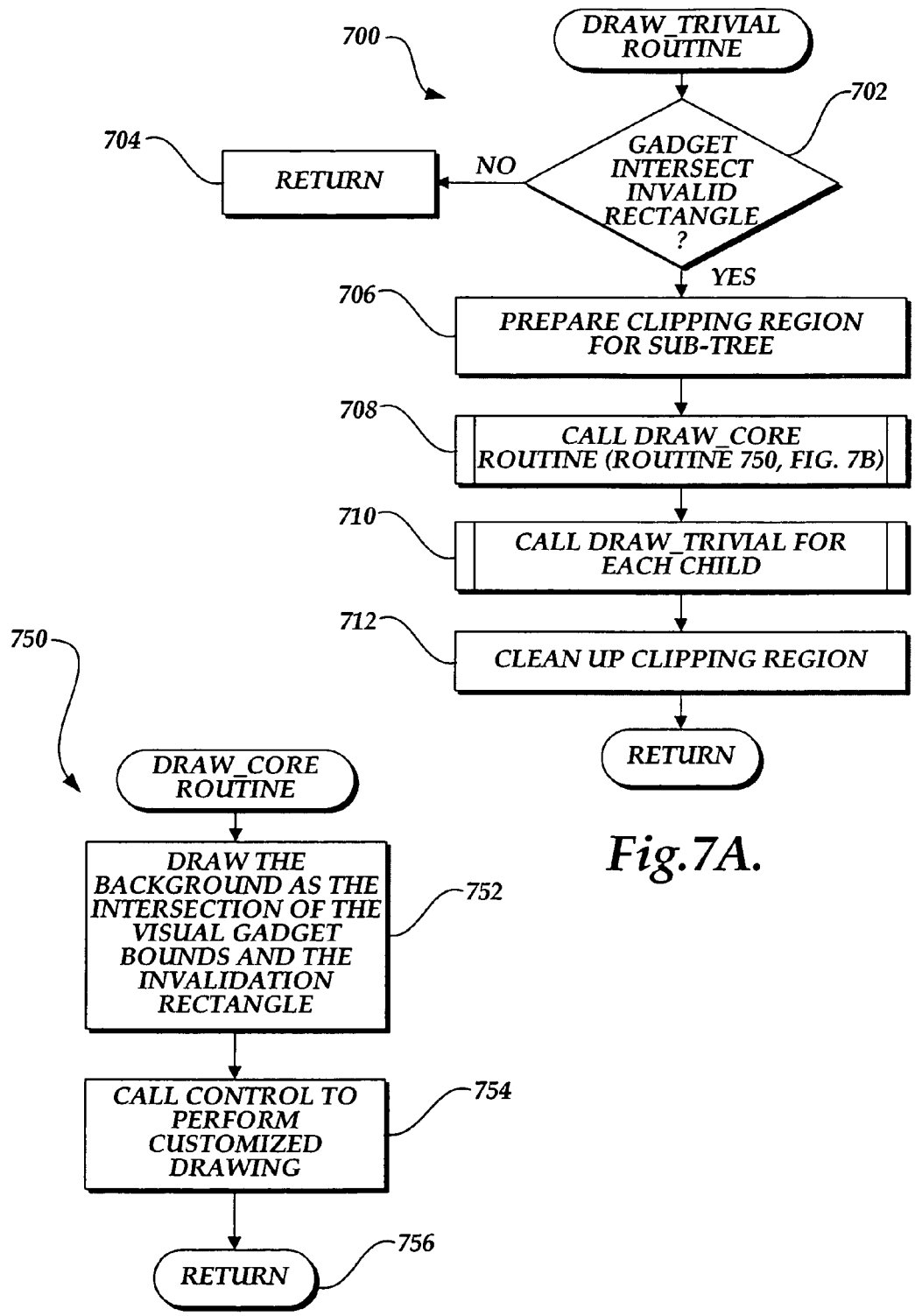
FIG. 7A is a flow diagram showing an illustrative routine for rendering a trivial node in a window tree according to an actual embodiment of the present invention.
FIG. 7B is a flow diagram showing an illustrative routine for rendering a node in a window tree according to an actual embodiment of the present invention.

Referring now to FIG. 7A, an illustrative Routine 700 will be described for implementing the DRAW_TRIVIAL routine mentioned above. The Routine 700 begins at block 702, where a determination is made as to whether the current Visual Gadget intersects the invalidation rectangle. If the current Visual Gadget does not intersect the invalidation rectangle, the Routine 700 branches to block 704, where it returns. If the Visual Gadget intersects the invalidation rectangle, the Routine 700 continues block 706, where the clipping region is prepared for the sub-tree. The Routine 700 then calls the DRAW_CORE routine to perform the actual rendering of the Visual Gadget of the specific node. The Routine 700 then continues to block 710, where the DRAW_TRIVIAL routine is again called for each child of the node. At block 712, the clipping region is cleaned up. At block 714, the Routine 700 returns.

Referring now to FIG. 7B, an illustrative Routine 750 for implementing the DRAW_CORE routine will be described. The Routine 750 begins at block 752 where the background is drawn as the intersection of the Visual Gadget bounds and the invalidation rectangle. From block 752, the Routine 750 continues to block 754, where the control is called to perform the customized drawing of the gadget. The Routine 750 then continues to block 756, where it returns.

Figure 8:
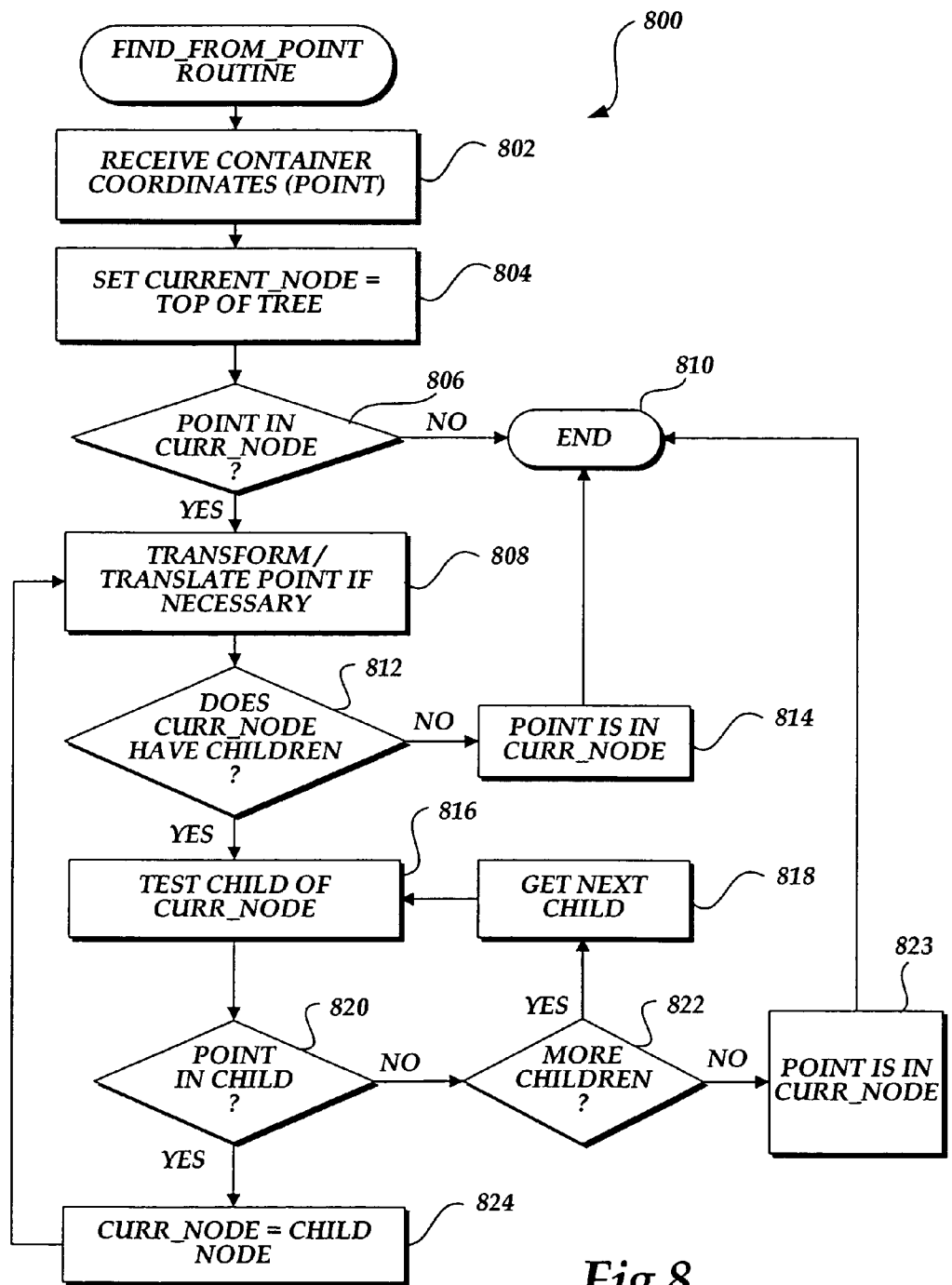
FIG. 8 is a flow diagram showing an illustrative routine for identifying a graphical object in a window tree based on received coordinates.

In addition to rendering the window tree, the window manager 76 also provides functionality for hit-testing input. When movement of a mouse cursor, or a mouse click, is received, a message is generated comprising the coordinates of the movement or click and transmitted to the window manager 76. In order to relay the message to the appropriate window and/or Visual Gadget, the window manager 76 must make a determination as to which Visual Gadget should receive the message. Because the window manager 76 provides for the translation and/or transformation of nodes in the window tree that is unknown to the corresponding Visual Gadget, the window manager 76 must take these translations into account when determining which gadget should be notified of the input. The FIND_FROM_POINT routine described below with reference to FIG. 8 provides this functionality. The window manager 76 must also be able to convert container coordinates into client coordinates relative to another Visual Gadget. The DIRECT_POINT routine provides this functionality and is described below with reference to FIG. 9. It may also be necessary to convert coordinates relative to one Visual Gadget into coordinates relative to another Visual Gadget. The MAP_POINTS routine provides this functionality and is described below with reference to FIG. 10.

Referring now to FIG. 8, an illustrative Routine 800 will be described for implementing the FIND_FROM_POINT routine mentioned above. As discussed briefly above, the FIND_FROM_POINT routine takes the coordinates of a point and returns the identity of the Visual Gadget in which the point is located, taking transformations and translations into account. The Routine 800 begins at block 802, where the location of the input point is received in container coordinates. The Routine 800 then continues to block 804, where the CURRENT_NODE variable is set to the node at the top of the window tree or sub-tree. From block 804, the Routine 800 continues to block 806, where a determination is made as to whether the point is in the Visual Gadget identified by the current node. If the point is not in the Visual Gadget identified by the current node, the point is also not in any of the Visual Gadgets identified by the node's children, so the Routine 800 branches to block 810, where it ends. If the point is in the Visual Gadget identified by the current node, the Routine 800 continues from block 806 to block 808, where any translation or transformation required at the node is applied to the input point. In this manner, the input point is translated or transformed into the same space as the visual object identified at the current node.

From block 808, the Routine 800 continues to block 812, where a determination is made as to whether the current node has children. If the current node does not have any children, the Routine 800 branches to block 814. Arrival at block 814 indicates that the point must be in the current node and, therefore, the current node is returned. The Routine 800 then continues to block 814 to block 810, where it ends.

If, at block 812, it is determined that the current node has children, the Routine 800 continues to block 816, where a test is made of a child of the current node. The Routine 800 then continues from block 816 to block 820, where a determination is made as to whether the point is located within the child of the current node. If the point is not located within the child, the Routine 800 branches to block 822, where a determination is made as to whether the current node has additional children. If the current node has no additional children, the Routine 800 branches to block 823. Arrival at block 823 indicates that the point is in the child node and the identity of the child node is returned. The Routine 800 then continues from block 823 to block 810, where it ends. If, at block 822, it is determined that the current node has additional children, the Routine 800 continues to block 818, where the next child is identified. The next child is then tested at blocks 816, 820, and 822 in a similar fashion as that described above.

If, at block 820, it is determined that the point is within the child node, the Routine 800 continues to block 824 where the CURRENT_NODE variable is set to the child node. The Routine 800 then returns to block 806, where the child node is tested in a similar manner to its parent. In this manner, the window tree is iteratively parsed to identify the child that contains the input point.

Figure 9:
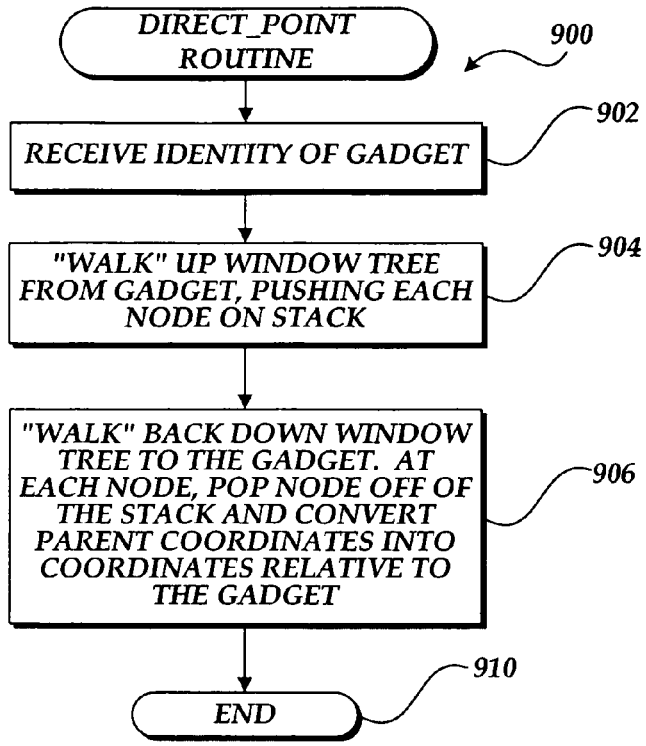
FIG. 9 is a flow diagram showing an illustrative routine for converting client coordinates into container coordinates according to an actual embodiment of the present invention.

Referring now to FIG. 9, an illustrative Routine 900 will be described for implementing the DIRECT_POINT routine. As mentioned briefly above, the DIRECT_POINT routine converts container coordinates that are in a known Visual Gadget into coordinates relative to the Visual Gadget. The Routine 900 begins at block 902, where the identity of the node containing the Visual Gadget and the container coordinates are received. From block 902, the Routine 900 continues to block 904, where the window tree is traversed from the identified node to the root, pushing each node on the stack. From block 904, the Routine 900 continues to block 906, where the window tree is traversed from the root back down to the identified node. At each node, the properties relating to the node are "popped" off of the stack and the coordinates of the point are converted into coordinates relative to the node. In this manner, the container coordinates are converted into coordinates relative to the identified Visual Gadget. The Routine 900 ends at block 910.

Figure 10:
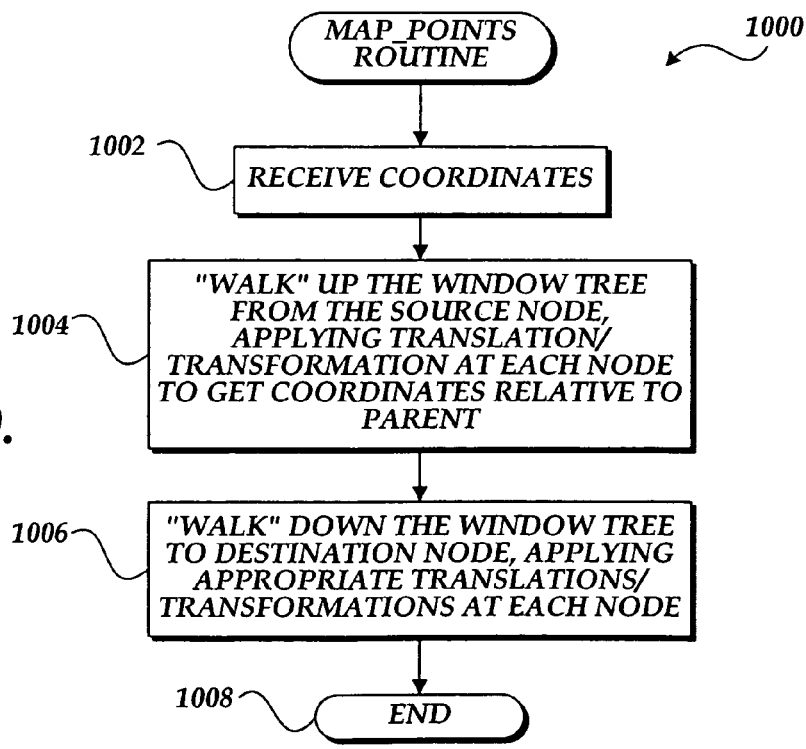
FIG. 10 is a flow diagram showing an illustrative route for converting coordinates relative to one object into coordinates relative to another object in an actual embodiment of the present invention.

Referring now to FIG. 10, an illustrative Routine 1000 for implementing the MAP_POINTS routine will be described. As mentioned briefly above, the MAP_POINTS routine converts coordinates relative to one Visual Gadget in the window tree into coordinates relative to another Visual Gadget in the window tree. The Routine 1000 begins at block 1002, where the coordinates are received. The Routine 1000 continues to block 1004, where the window tree is traversed from the node identifying the Visual Gadget from which the coordinates are to be converted to the parent of the Visual Gadget to which the coordinates are to be converted. At each node, any necessary translation or transformation is applied.

From block 1004, the Routine 1000 continues to block 1006 where the window tree is traversed from the nearest parent to the node identifying the Visual Gadget to which the coordinates are to be converted. At each node appropriate translations and transformations are applied. In this manner, the coordinates of a point relative to one Visual Gadget in the window tree may be converted to coordinates relative to another Visual Gadget taking translations and transformations into account.

In light of the above, it should be appreciated by those skilled in the art that the present invention provides a method, apparatus, and computer-readable medium for providing high-performance rendering and hit-testing of a window tree. While an actual embodiment of the invention has been illustrated and described, it will be appreciated that various changes can be made therein without departing from the spirit and scope of the invention.

The invention claimed is:

1. A method for rendering a window tree having a plurality of nodes, comprising:
    defining a recursive procedure comprising,
        identifying one of said nodes to be rendered;
        calculating the bounds of an invalidation rectangle in coordinates relative to said object and determining whether said object should be rendered;
        in response to determining that said object should be rendered, copying rendering information for a subtree of said window tree defined by said identified node onto a stack
        rendering said object and determining whether said object is a trivial object, wherein determining whether said object is a trivial object comprises determining whether said object and any of its children have GS_ZEROORIGIN, GS_CLIPSIBLINGS, GS_BUFFERED and GS_CACHED parameters set to off and do not have any transforms applied;
        in response to determining that the object is a trivial object, rendering any children of said node using an optimized trivial rendering procedure; and
        in response to determining that said object is not a trivial object, rendering any children of said node using said recursive procedure.

2. The method of claim 1, wherein calculating the bounds of an invalidation rectangle in coordinates relative to said object comprises:
    determining whether a transformation is applied to said object;
    in response to determining that no transformation should be applied to said object, using data from said stack associated with a parent node of said object as said invalidation rectangle.

3. The method of claim 1, wherein determining whether said object is a trivial object further comprise examining a bit associated with said object.

4. The method of claim 3, further comprising:
    in response to determining that said object is a trivial object, rendering any children of said node using a trivial recursive rendering procedure.

5. The method of claim 4, wherein said trivial recursive rendering procedure comprises:
    defining a recursive procedure comprising,
        determining whether said node intersects an invalidation rectangle;
        in response to determining that said node intersects an invalidation rectangle, rendering a visual object at said node; and
        calling said trivial recursive rendering procedure for each of said children of said node.

6. A computer-controlled apparatus capable of performing the method of claim 3.

7. A computer-readable storage medium comprising instructions which, when executed by a computer, cause the computer to perform the method of claim 3.

8. The method of claim 1, wherein determining whether said object should be rendered comprises determining the intersection of said object and said bounds of said invalidation rectangle in coordinates relative to said object.

9. A computer-controlled apparatus capable of performing the method of claim 8.

10. A computer-readable storage medium comprising instructions which, when executed by a computer, cause the computer to perform the method of claim 8.

11. A computer-controlled apparatus capable of performing the method of claim 1.

12. A computer-readable storage medium comprising instructions which, when executed by a computer, cause the computer to perform the method of claim 1.

13. The method of claim 1, wherein determining if the object is a trivial object comprises determining whether the object requires world transforms.

* * * * *